United States Patent [19]

Hardesty et al.

[11] Patent Number: 5,504,315
[45] Date of Patent: * Apr. 2, 1996

[54] MEANS AND METHOD FOR NON-CONTACT BAR CODE LABEL VERIFICATION

[75] Inventors: John Hardesty, Ervine, Calif.; Edward Barkan; Christina S. Barkan, both of South Setauket, N.Y.; Dean Fletcher, Mission Viejo; Timothy Almeida, Santa Ana, both of Calif.

[73] Assignee: Symbol Technologies, Inc., Bohemia, N.Y.

[ * ] Notice: The portion of the term of this patent subsequent to Jun. 8, 2010, has been disclaimed.

[21] Appl. No.: 59,252

[22] Filed: May 7, 1993

Related U.S. Application Data

[63] Continuation of Ser. No. 592,021, Sep. 28, 1990, Pat. No. 5,218,190.

[51] Int. Cl.$^6$ ................................................. G06K 7/10
[52] U.S. Cl. ........................................... 235/462; 235/437
[58] Field of Search .................................. 235/462, 472, 235/463, 466, 375, 432, 436, 437, 438; 364/571.04, 552, 563

[56] References Cited

U.S. PATENT DOCUMENTS

| | | | |
|---|---|---|---|
| 4,199,816 | 4/1980 | Humphrey | 364/571.04 |
| 4,251,798 | 2/1981 | Swartz et al. | |
| 4,360,798 | 11/1982 | Swartz et al. | 235/463 |
| 4,369,361 | 1/1983 | Swartz et al. | 235/462 |
| 4,508,686 | 4/1985 | Shaber et al. | 235/466 |
| 4,705,939 | 11/1987 | Ulinski | 364/563 |
| 4,795,281 | 1/1989 | Ulinksi et al. | 235/432 |
| 4,860,226 | 8/1989 | Martin et al. | 364/552 |
| 4,894,790 | 1/1990 | Yotsuya et al. | 364/552 |
| 5,034,904 | 7/1991 | Moy | 364/571.04 |
| 5,067,093 | 11/1991 | Przybylowicz et al. | 364/571.04 |
| 5,194,720 | 3/1993 | Reinnagel et al. | 235/437 |
| 5,218,190 | 6/1993 | Hardesty et al. | 235/462 |

FOREIGN PATENT DOCUMENTS 55-88172  7/1980  Japan .

OTHER PUBLICATIONS

"Quick Check 500" brochure, Photographic Sciences, 2 pages (1989).
Barkan, Automatic I.D. News, "Author verifies the key to bar coding success", (Nov. 1988).

Primary Examiner—Robert A. Weinhardt
Attorney, Agent, or Firm—James H. Beusse

[57] ABSTRACT

A portable, conveniently usable, and inexpensive non-contact bar code verifier permits testing of bar code labels at some arbitrary but constant distance from the verifier. Means are provided for analog analysis of bar code label contrast levels, and for derivation of new, instructive indices characterizing the readability and print quality. Additionally, a new method for determination of absolute bar code label dimensions is disclosed. The method of calibration for arbitrary scanning distance and angle standardizes not only the verifier's ability to measure absolute dimensions at unknown distances, but also its ability to discern contrast under arbitrary lighting conditions and scanning equipment. This is accomplished by employing calibration standards of known characteristics. Bar code verification information may be stored and/or employed for a variety of control and analytical functions as recognized in the art.

9 Claims, 10 Drawing Sheets

BAR CODE LABEL

RAW REFLECTIVITY SIGNAL

DIGITAL SIGNAL

TIMED TRANSITION INTERVAL

BAR CODE LABEL

RAW REFLECTIVITY SIGNAL

DIGITIZED ANALOG SIGNAL

```
ANALYSIS SCREEN 1
10/11/89    10:38 AM
Code 3 of 9
STI3OF4
STI             93%
GRADE            A

PRESS <H> FOR HELP
```

FIG. 7A

```
ANALYSIS SCREEN 2
BAR WIDTH RATIO: 2.98
GROWTH/LOSS: +00.16
LMARGIN RATIO  GOOD
RMARGIN RATIO  GOOD
PERCENT DECODE 100%
CONTRAST:        67%
PRESS <H> FOR HELP
```

FIG. 7B

```
ANALYSIS SCREEN 3A
   ELEMENT REPORT
       MIN  AVG  MAX
WBAR-  30   31   32
NBAR-  11   12   14
WSPC-  29   32   33
NSPC-  10   12   14
  PRESS <H> FOR HELP
```

FIG. 7C

```
ANALYSIS SCREEN 3B
   ELEMENT REPORT
MOD MIN AVG MAX RAT
 1   12  14  16
 2   26  28  30 2.00
 3   40  42  44 3.00
 4   54  54  54 3.88
PRESS<H> FOR HELP
```

FIG. 7D

```
ANALYSIS SCREEN 4
   MEASUREMENTS
    *STI3OF4*
BAR  SPC  BAR  SPC
 12   15   12   43
 27   15   12   15
 41   15
  PRESS <H> FOR HELP
```

FIG. 7E

```
ANALYSIS SCREEN 5
    DEVIATIONS
    *STI3OF4*
BAR  SPC  BAR  SPC
 -2   +1    0   +1
  0   +1   -2   +1
  0   +1
 PRESS <H> FOR HELP
```

FIG. 7F

MEANS AND METHOD FOR NON-CONTACT BAR CODE LABEL VERIFICATION

This is a continuation of application Ser. No. 07/592,021, filed Sep. 28, 1990, now U.S. Pat. No. 5,218,190.

TABLE OF CONTENTS
BACKGROUND OF THE INVENTION
- 1.1 Field of the Invention
- 1.2 Description of Prior Art
2. SUMMARY OF THE INVENTION
3. BRIEF DESCRIPTION OF THE DRAWINGS
4. DETAILED DESCRIPTION OF SPECIFIC EMBODIMENTS
  - 4.1 Overview of Verifier Operation
  - 4.2 Functional Description
    - 4.2.1 CALIBRATE
    - 4.2.2 AUTO VERIFY
    - 4.2.3 DECODE DIAGNOSTICS
    - 4.2.4 REVIEW DATA
    - 4.2.5 OPTIONS
    - 4.2.6 USER ID
  - 4.3 Hardware Setup
    - 4.3.1 Scanning Module
    - 4.3.2 Electrical Interface Cable
    - 4.3.3 Processor unit
      - 4.3.3(a) Microprocessor
      - 4.3.3(b) Memory
      - 4.3.3(c) Gate Array
      - 4.3.3(d) Communications
      - 4.3.3(e) Analog Circuitry
      - 4.3.3(f) Other
  - 4.4 Software Setup
    - 4.4.1 Calibration
    - 4.4.2 Software Generated Indices and Information
    - 4.4.3 AUTO VERIFY Method
    - 4.4.4 Reflectance Compensation for High-Density Labels
5. CONCLUSION
WHAT IS CLAIMED IS:
ABSTRACT

1. BACKGROUND OF THE INVENTION

1.1 Field of the Invention

In inventory-intensive wholesale and retail operations, bar coding systems have become popularly employed in tracking the flow of products. Bar coding systems frequently include not only printing and reading equipment, but also means for verification. Verification is a process by which a bar code label is analyzed to determine if it has been printed in accordance with print specifications dictated by the particular bar code symbology (e.g., UPC, Code 39, MSI/Plessey, etc.) and industry group (e.g., ANSI, LOGMARS, IATA, etc.) against which it was printed.

The present invention relates generally to optical scanning systems for use in bar coding systems. More particularly, the present invention relates to portable, non-contact bar code verifier arrangements and method by which the quality and readability of scanned bar code labels are measured, analyzed, and reported in a convenient and inexpensive way.

1.2 Description of Prior Art

The advantages of bar coding systems are well-known. In order for a bar code system to effectively handle inventory information, it must comprise at least two properly functioning subsystems: a bar code printing system and a bar code reading system. It is the shortcomings in either or both of these two subsystems that often necessitate a third, a bar code verification system.

Among the problems occurring as a result of faulty printing systems are insufficient contrast between bars and spaces (collectively referred to in the art as "elements") of a bar code label, unintentional bar width growth or loss due to ink spread or shrinkage, ink voids or specs or other printing errors. Bar code reading systems fail due to hardware problems such as maladjusted or ineffective sensors, emitters, or processors in reading apparatus, and, in addition, due to user mistakes such as improper positioning of the scanner relative to the bar code label of interest or improper programming of the processor in the reading apparatus.

For these reasons, those who employ bar code systems often have need for a verification system which will effectively identify existing or potential problems in the printing and reading systems, thus allowing the user to adjust the bar code system to derive its maximum efficiency and performance potential. For example, bar code printers might use a verification program as part of a quality control scheme designed to monitor print quality trends during the printing process and stop printing as bar codes begin to be printed out of specification. Alternatively, downstream bar code system users, warehouse inventory managers, for example, might use information derived from a bar code verifier to alert him/her to the need to print new labels for a group of products, or to note bar code labels that will require special handling as they move through the system. An article by one of the present inventors on the subject of bar code verification is instructive in pointing out potential bar code problems, and potential verification solutions. See "Opinion" by Tina Barkan at: "Automatic I.D. News," November 1988.

Previously, two types of verifiers, both requiring contact of the scanner with the bar code label, have been employed. The first, a contact-wand, uses a light emitting source at the end of a pencil-looking wand which is guided manually over the bar code label by the user. Light emitted from the light source is reflected by the bar code label pattern and received by a detector also in the wand. This type of verifier requires a single pass of the wand over the bar code label to check the label and acquire the appropriate information. A second type of prior art verifier is the laser-based verifier which also requires contact between the head of the scanner unit and the bar code label. However, the laser-based verifier checks the bar code label multiple times as the laser beam sweeps rapidly back and forth across the label.

The known optical scanning verifier systems have not proven to be altogether satisfactory for a variety of reasons. First, contact-type verifiers are inconvenient. Furthermore, by virtue of the fact that they am designed to block out ambient lighting conditions, contact-type verifiers are not accurately predictive of bar code readability under various reading conditions affecting noncontact-type readers. Second, analysis of quality and readability of bar code labels in prior art verifiers has not been as descriptive and instructive as often desired. Third, prior art verifiers have not had the added capability of being usable as bar code readers. Fourth, prior-an laser-based verifiers have generally not been conveniently portable due to their large size. Fifth, prior-art verifiers have been expensive due to their large number of components required for signal processing. Finally, due to the use of separate technology for verification and reading, bar code verifiers have not been accurately predictive of a reader's ability to read a particular bar code label.

2. SUMMARY OF THE INVENTION

The present invention overcomes some of the drawbacks of the prior art. A portable, conveniently usable, relatively inexpensive non-contact bar code verifier is provided which will test bar code labels removed some arbitrary, but constant distance from the verifier. The bar code verifier can calibrate its operation according to the distance by which it is removed from the bar code label being analyzed. The calibration approach helps compensate for variations in, e.g., the motor speed of the verifier scanner subsystem and other verifier characteristics.

Further, according to the present invention, means are provided for analysis of print contrast quality in bar code labels.

Additionally, a bar coder verifier is provided that can also function as a bar code reader.

Also, according to the present invention, means are provided for verifying a bar code label using a wavelength of light and scanning technology similar to those that will subsequently be used by reading apparatus.

Additionally, means are provided for determining the absolute dimensions of bar code label elements.

The present invention includes bar code label verifier apparatus for use in measuring and analyzing the quality and readability of printed bar code labels ("target labels"). The apparatus includes means for acquiring digital and analog information characterizing a bar code label (sometimes referred to herein as "reflectivity data"), coupled with means for processing and analyzing that information, and for reporting bar code label readability and print quality indices as derived from the analog and digital information.

Visible laser light emitted by verifier emitter means is reflected from a series of "white" (comparatively more-reflective) spaces and "black" (comparatively less-reflective) bars comprising a bar code label, and, subsequently is received by verifier scan means. Raw signal processing means yield a series of data corresponding to analog reflectivity levels as measured by said scan means and, other series of data corresponding to binary digital reflectivity levels as measured by said scan means. The data series are stored in random access memory (RAM) using direct memory access (DMA) operations. From RAM, the data are accessible to the verifier processor and become the basis for a number of software functions performed and indices derived by the processor.

In accordance with the non-contact feature of the present invention, a method is provided by which the verifier software calibrates its measuring parameters to compensate for an arbitrary, but constant distance and angle of the scanner module (comprising emitter and scan means) relative to the bar code label of interest. Calibration is accomplished by scanning one or two calibration standard patterns of known element (bar and space) size and print quality.

Notably, the verifier analyzes the reflectivity data received from scanning a calibration standard pattern under then-ambient conditions (at an arbitrary standard distance) to determine reflectivity data corresponding to a plurality of points on the calibration standard pattern. The verifier uses the calibration-standard data to develop a "map" of the perceived widths of the various bars and spaces comprising the calibration standard pattern. These perceived widths can be rendered less than optimally accurate by, e.g., variations in scanner motor speed. The actual widths of the calibration-pattern bars and spaces are known, however; this enables the verifier to compute appropriate correction factors to compensate for such inaccuracies.

When a target label is subsequently scanned for verification, a map of perceived widths of a target label is likewise generated; the verification scanning is performed under ambient conditions similar to the calibration-pattern scan and at the same standard distance. Applying the previously computed correction factors to the information represented in the map results in a more accurate representation of the target label.

In one embodiment, the verifier calibrates itself for arbitrary, but constant lighting conditions affecting its operation. The two bar code calibration standards used for measurement calibration are of different contrast levels—both levels known to the verifier software. By scanning both calibration standard labels, the verifier creates a contrast scale against which contrast levels derived in the normal operation of the verifier are compared. Once calibration has been performed for a specific scanner module orientation (distance and angle) relative to the bar code label of interest, the verifier is ready for operation in its normal mode. Alternatively, of course, a single calibration standard may be used.

According to another feature of the present invention, methods are provided for identifying and decoding bar code labels and, subsequently, issuing diagnostic reports characterizing their readability. A target bar code label scanned by the verifier is classified as a member of a certain symbology (e.g., C39, C93, UPC, etc) by an application of the following three step method:

1) Identify the target label's boundaries by locating its margins;

2) Check the number of transitions (i.e., bar-to- space or space-to-bar), because certain symbologies can have only certain numbers of transitions; and 3) Attempt a character-by-character decode of the symbologies passed by step #2.

According to another feature of the invention, the verifier can be limited in the possible symbologies it recognizes and attempts to analyze. That is, a user may specify that the verifier is to assume that the target label of interest belongs to a certain symbology or group of symbologies.

According to another feature of the invention, means are provided for analysis of print contrast and quality of bar code labels. Software processing of both analog reflectivity data and digital reflectivity data yield a plurality of functions and indices reflecting print contrast and quality, respectfully. Functions performed and indices produced by the verifier processor using digital and analog data in normal operation include:

Identification of symbology and data content of label;

Calculation of label print contrast index;

Characterization of label print quality rating as measured by bar width growth/loss, element absolute widths and width ratios;

Calculation of percent decode index,

Calculation of margins rating;

Calculation of weighted "scannability" index.

A verifier processor unit is preferably equipped with output means including a display screen, printer terminal, and a scrim output port. Input means comprising a keyboard are also provided. Processor software functions are menu driven to enable the user to determine the mode of operation of the verifier.

Additional hardware features of the present invention include a scanner gun trainer for standardizing scanner orientation relative to bar code labels of interest; visible laser-based diode emitter means; use of direct memory access (DMA) hardware internal to microprocessor to acquire laser scan information (digital and analog); use of custom application modules for switching applications.

Additional software features of the present invention include downward application of the verifier as a bar code reader; certain software generated print quality and readability indices which are new to the art.

Information derived by the verifier of the present invention may be stored and/or employed in control and analytical functions related to bar code system quality as commonly recognized in the art.

These and other features of the invention will become apparent hereinafter. It will be understood that the present invention comprises many separate novel features which can be employed individually or in combination and, can be arranged in various configurations or orders to accomplish substantially the same results and objects. Accordingly, any description of arrangements of equipment and methods given in the following or preceding explanation should be understood to be illustrative and exemplary in nature, and is not intended to be self-limiting in any manner whatsoever.

An example of a verifier employing features of the present invention in one exemplary embodiment, is the Laser Chek I,I by Symbol Technologies, Inc. As an aid to understanding the present invention, the User Manual for the Laser Chek II is included as Appendix D in the parent application, which issued as U.S. Pat. No. 5,218,190 (hereby incorporated by reference). Additionally, source code for the Laser Chek II software is included as Appendix E in the parent application, which issued as U.S. Pat. No. 5,218,190 (hereby incorporated by reference).

3. BRIEF DESCRIPTION OF THE DRAWINGS

FIGS. 7A–7F show exemplary analysis report screens used to report various information derived by a verifier operating in so-called AUTO VERIFY mode.

FIGS. 8A–D show exemplary analysis report screens used to report various information derived by a verifier operating in so-called DECODE DIAGNOSTICS mode.

Figure 9:
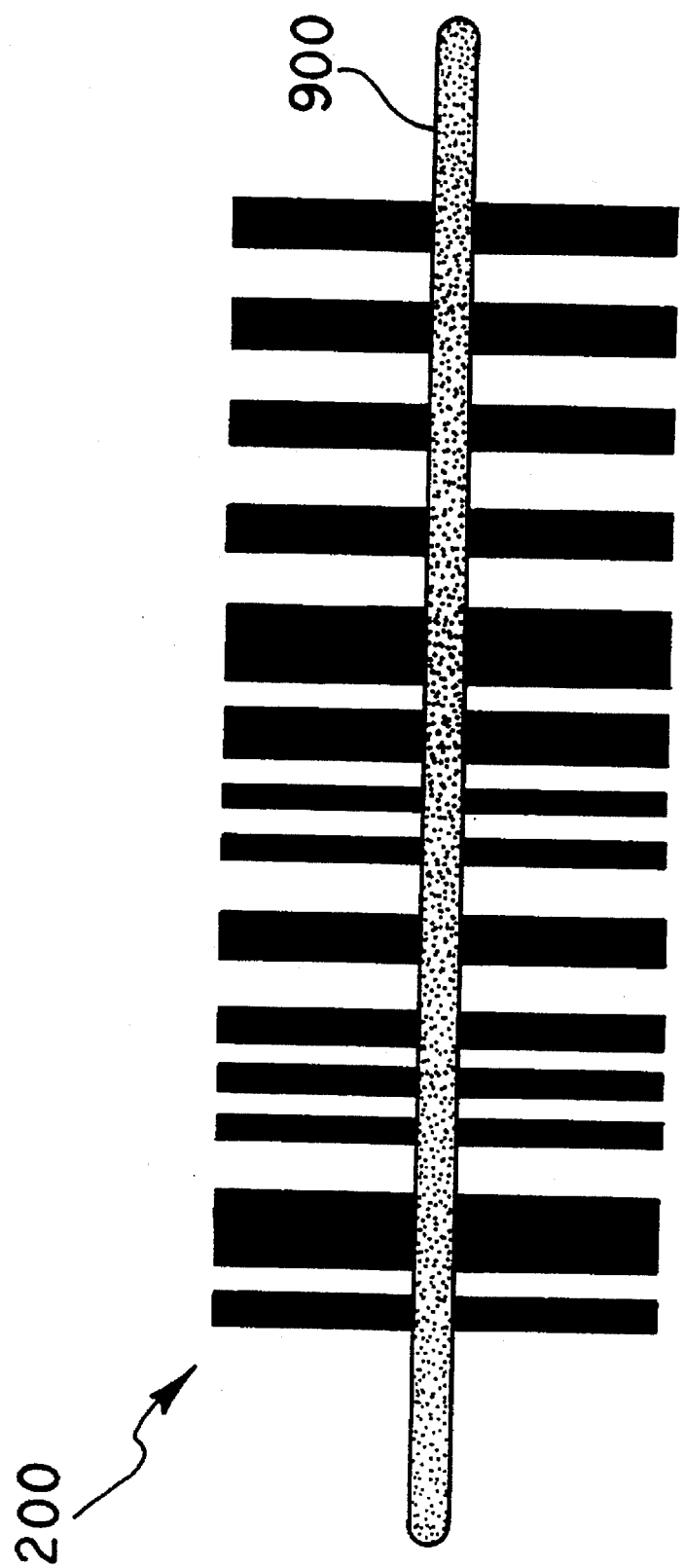

FIG. 9 shows the orientation of the laser scan beam emitted by the verifier relative to the bar code label of interest in normal operation.

Figure 10A:
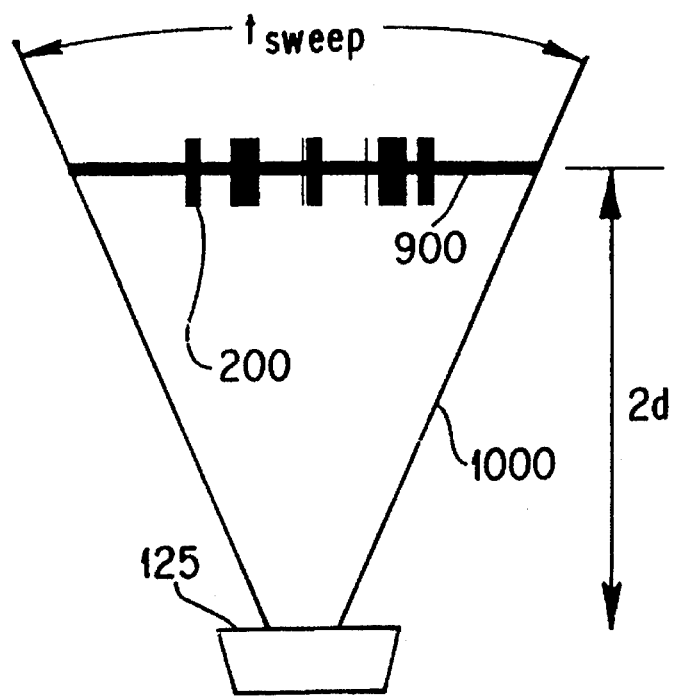
Figure 10B:
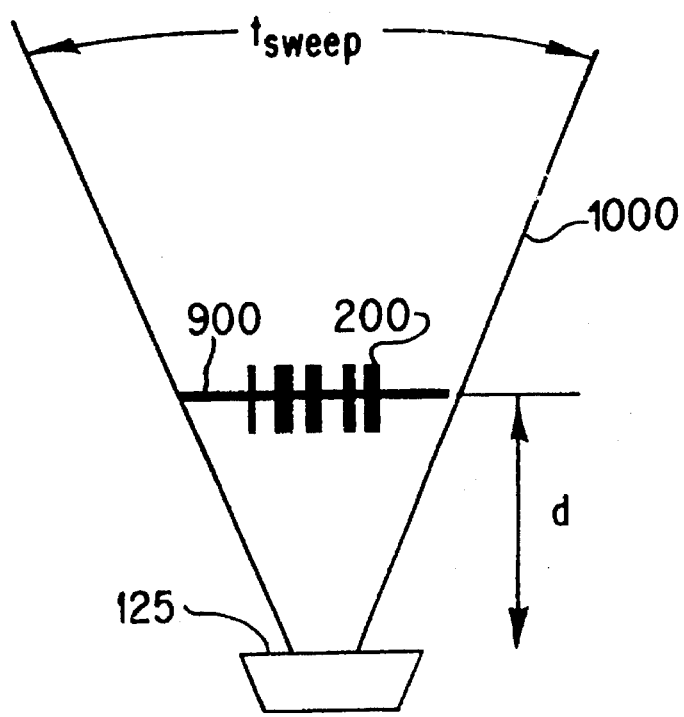

FIG. 10 shows differing possible placements of the verifier scanning means relative to the label of interest which are illustrative of the need for calibration.

4. DETAILED DESCRIPTION OF SPECIFIC EMBODIMENTS.

4.1 Overview of Verifier Operation

Figure 1:
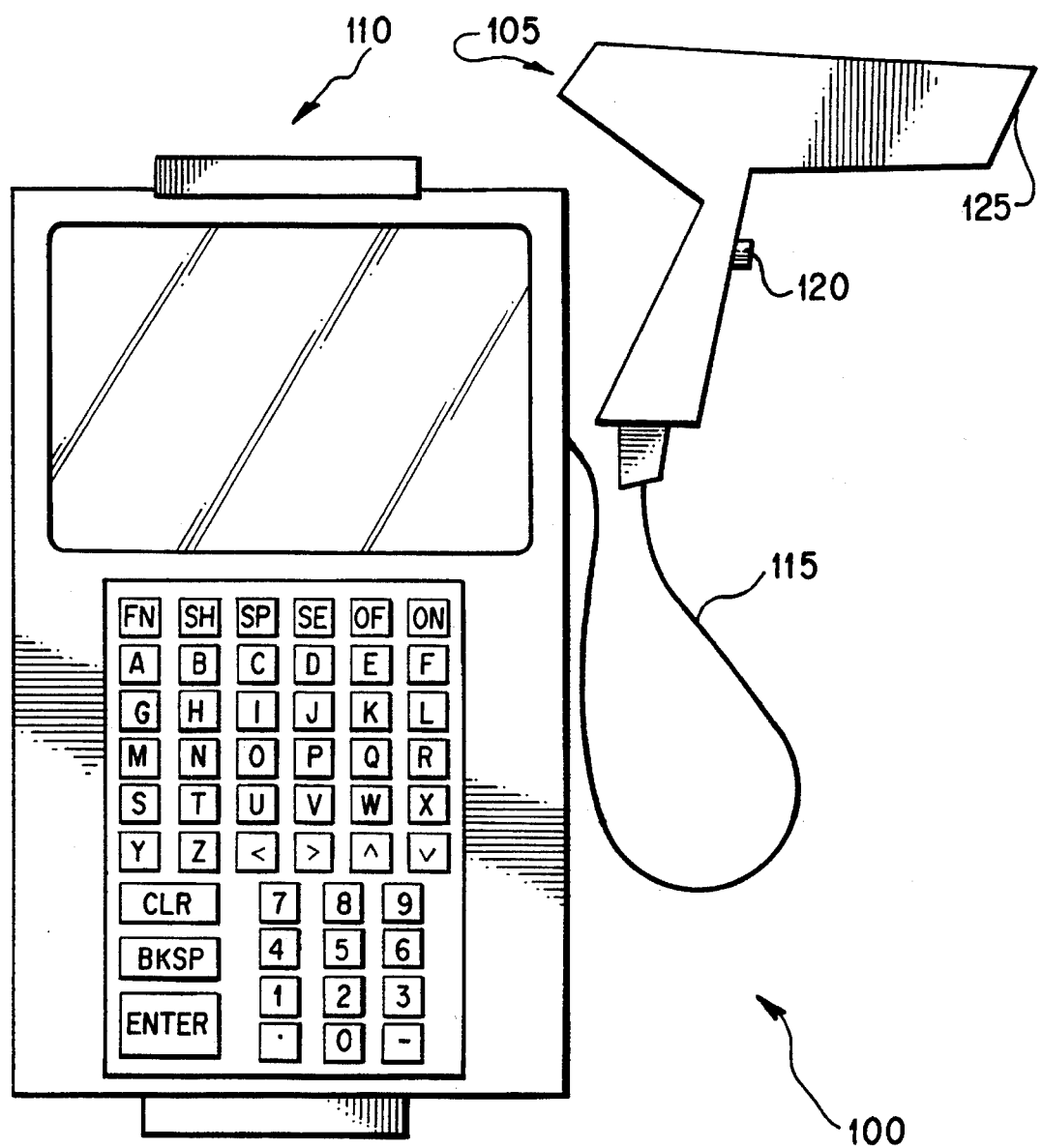
FIG. 1 shows in general an exemplary specific embodiment of the present invention.
Figure 2:
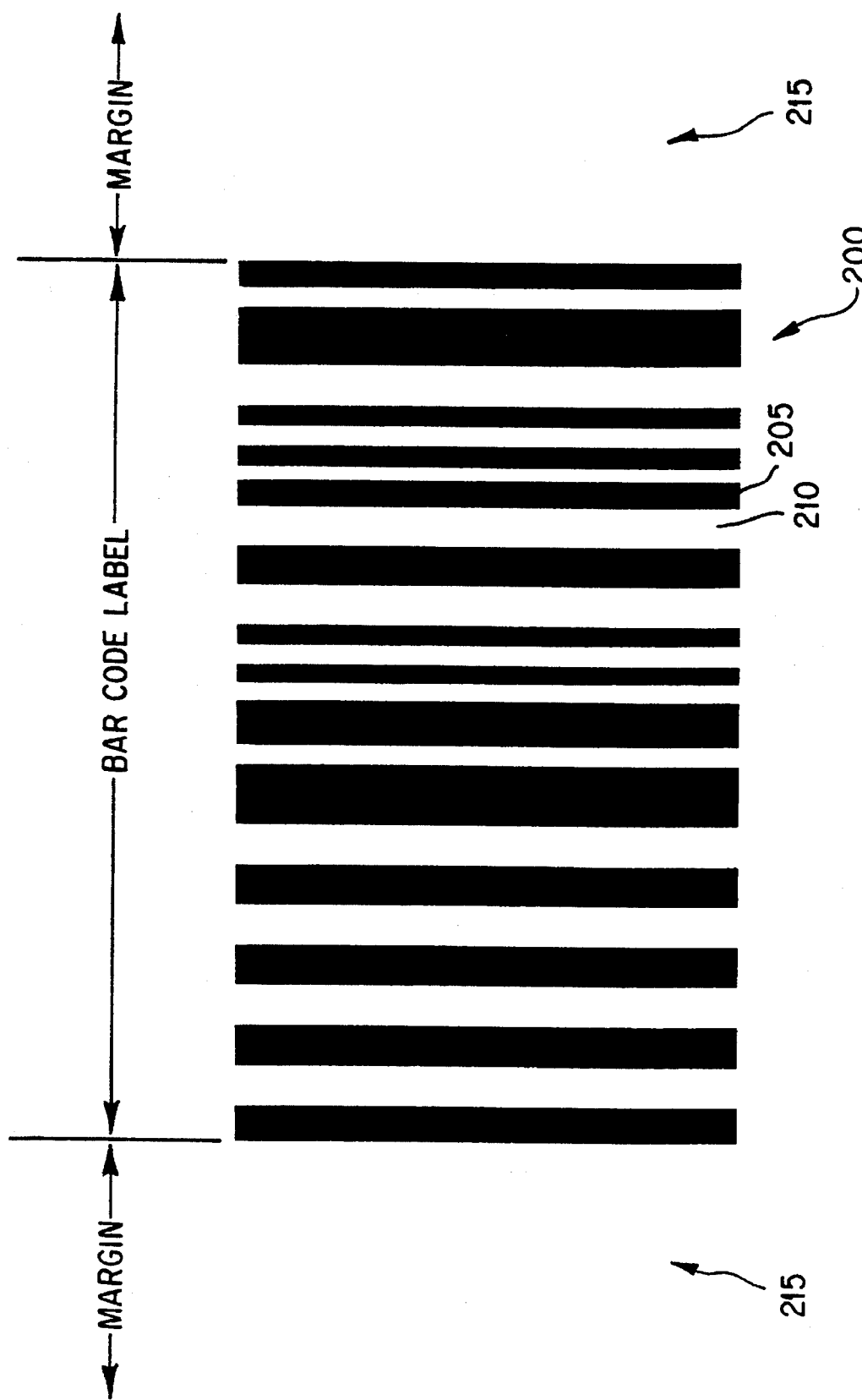
FIG. 2 shows an enlarged view of a bar code label.

Turning now to FIG. 1, a bar code label verifier 100 constituting one illustrative embodiment of the present invention is shown. A scanning module 105 is operatively attached to a processor unit 110 via an electrical interface cable 115. A trigger 120 functions to initiate a scan operation by the scanning module 105. Laser light is emitted in a beam from an emitting means located behind a scanning window 125. The scanning window 125 and associated components (e.g., laser emitter components and optical components) may be of a design similar to that shown in U.S. Pat. No. 4,897,532, "Portable Laser Diode Scanning Head," by Swartz et al., issued Jan. 30, 1990. The laser beam sweeps back and forth rapidly in a motion horizontal to the long axis of the rectangular scanning window 125 (shown from the side). FIG. 2 shows generally a bar code label 200. As emitted laser light impinges on a remotely located bar code label 200, it is reflected to varying degrees by the bars 205 and spaces 210 comprising the bar code label 200. Reflected light is detected by a radiation sensitive scan means also located behind scanning window 125. Said scan means functions to produce an analog electrical signal proportional to the intensity of radiation impinging upon it.

In order to calibrate verifier operation for the unknown distance and angle of the emitting means and scan means relative to the subject bar code labels, a calibration routine is executed which entails the user scanning two calibration standard labels of known characteristics. The perceived widths and contrast of bars and spaces constituting the calibration standard labels are compared to previously stored known widths and contrast in order to derive conversion factors to be used subsequently in relating relative scan data to absolute distances and contrast levels.

Three states of operation are provided for verifier operation. A programming state is provided for use in allowing verifier users to alter and customize verifier operational parameters. A calibration state is provided by which users will calibrate the verifier for the arbitrary, but constant conditions under which it will verify bar code labels in normal operation state. Finally, a normal operation state is provided for scanning bar code labels of interest.

Figure 3A:
FIGS. 3A–3G show the effects of signal processing on the raw reflectivity signal derived by verifier sensing means.
Figure 3B:
Figure 3C:
Figure 3D:
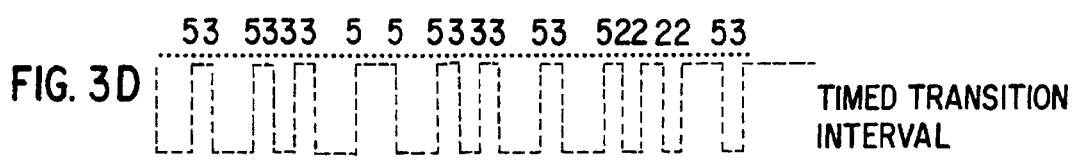
Figure 3E:
Figure 3F:
Figure 3G:

In normal operation, flight reflected from a subject label 200 is sensed by scan means located in scanning module 105, behind scanning window 125. Conventional signal processing occurs locally to the scanning module 105 and in the unit 110, and results in twenty-eight series of data points, each series corresponding to a binary digital representation of the light reflected from the bar code label during one emitting means sweep. FIG. 3A illustrates the step-by-step effect of processing on the raw reflectivity signal derived from scan means. An analog-to-digital converter located in the scanning module converts the analog signal into a binary signal Subsequently, in the unit 110, that binary digital signal is converted to a time-based count of relative perceived transition widths. That is, a clocking digitizer creates discrete data points corresponding to the perceived time-spacing between reflectivity level transitions. Only a representative number of points are shown in FIG. 3A for illustration. It will be understood that one data point will be created by the clocking digitizer for each transition perceived. It will further be appreciated that the series of data labeled "Time Transition Intervals" is representative of the relative distance between reflectivity level transitions detected by scan means. These data are placed in random access memory (RAM) storage by direct memory access (DMA) operations. Immediately thereafter, the scanning module 125 acquires another series of data, this series corresponding to analog reflectivity levels detected by the scan means during one emitting means sweep. FIG. 3B illustrates this step-by-step effect of signal processing on the raw reflectivity signal derived from scan means. A digitizer creates discrete data points corresponding to the analog reflectivity levels perceived by the scan means and further amplified by a differential amplifier. The digitizer and the differential amplifier circuitry are disclosed further in the section "Hardware Setup". It will be appreciated that the series of data labeled "Digitized Analog Signal" is representative of the reflectivity level detected by scan means. Again, this series of data is transferred into RAM in the processor unit via DMA operations, as disclosed hereinafter. With all 29 sets of data in place RAM, the scanning operation is complete.

A processor like a Hitachi HD64180 in the processor unit 110 accesses the data in RAM storage as needed in the software performance of functions and calculation of indices to be specified hereinafter. It will be appreciated that the Hitachi HD64180 is also equipped to execute the DMA transfers of scan data into RAM.

Subsequent processing of the analog and digital data sets decodes and identifies the scanned bar code label and yields a plurality of indices characterizing its readability and print quality.

4.2 Functional Description

In operation, a bar code verifier 100 according to the present invention functions as described hereinafter.

Figure 4A:
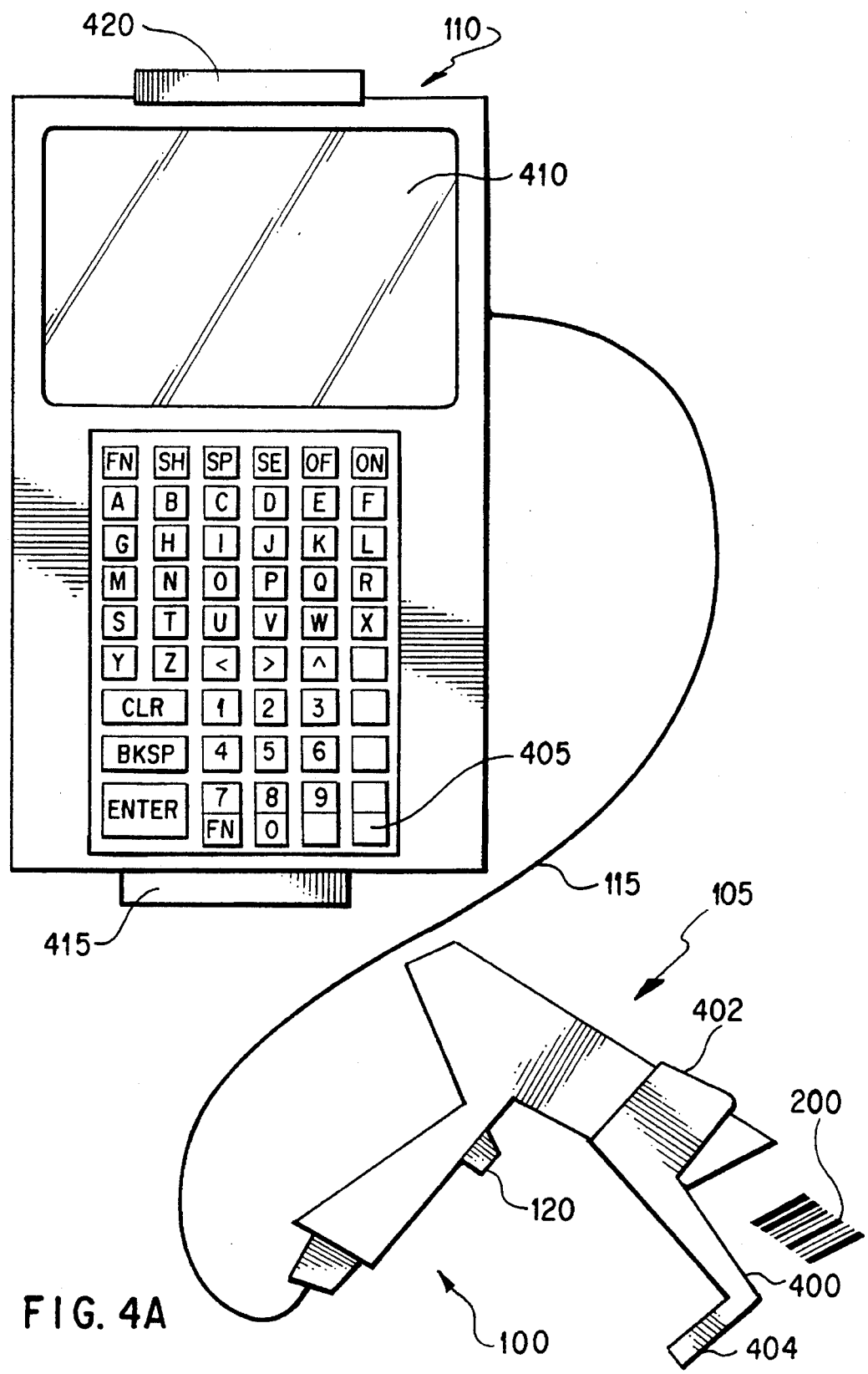
FIG. 4A shows generally an exemplary specific embodiment of the present invention as arranged during operation.

FIG. 4A shows the bar code verifier 100 as connected and situated during normal operation. The processor unit 110, interface cable 115, and scanning module 105 are functionally connected. The scanning module 105 is preferably hand-held by the user and means are provided for attaching the processor unit 110 to the user's belt for portability and convenience in use. The trigger 120 is activated by the user and serves to initiate a scan operation once the scanning module 105 has been properly positioned above the bar code label 200 of interest.

An important feature of the present invention lies in the ability to make measurements at arbitrary, but constant orientation of verifier scanner module 105 relative to the bar code label 200 of interest. In order to assist the user in maintaining constancy of scanner module orientation, a plexiglass scanner module trainer 400 is provided. The scanning window end of the scanning module 105 fits into a receptacle slot 402 on the trainer 400. The base 404 of the trainer 400 rests on a surface in the same plane as the bar code label 200 of interest. The trainer 400 provides a convenient way of maintaining a particular scanning module orientation relative to bar code label 200 after the verifier has been calibrated for that orientation.

Figure 4B:
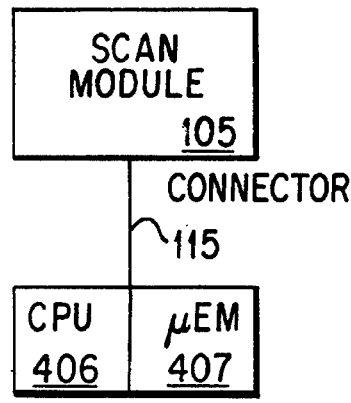
FIG. 4B is a block diagram of certain components of the embodiment.

As shown in FIGS. 4A and 4B, the portable processor unit 110 is equipped with a keyboard 405 for receiving user input at appropriate times during verifier operation; a central processing unit (CPU) 406 for performing various control and computation program functions described herein; a memory unit 407 accessible to the CPU 406 for storing program instructions and data (which of course may comprise DRAMs, SRAMs, ROMs, etc., in various combinations as desired); and a monitor 410 for issuing menu choices and decode reports to the user at appropriate times during the verifier operation. A host computer port 415 for connecting to a host computer and printer port 420 are available for use in the corresponding output modes. In one embodiment, the processor unit 110 is battery operated.

Figure 5:
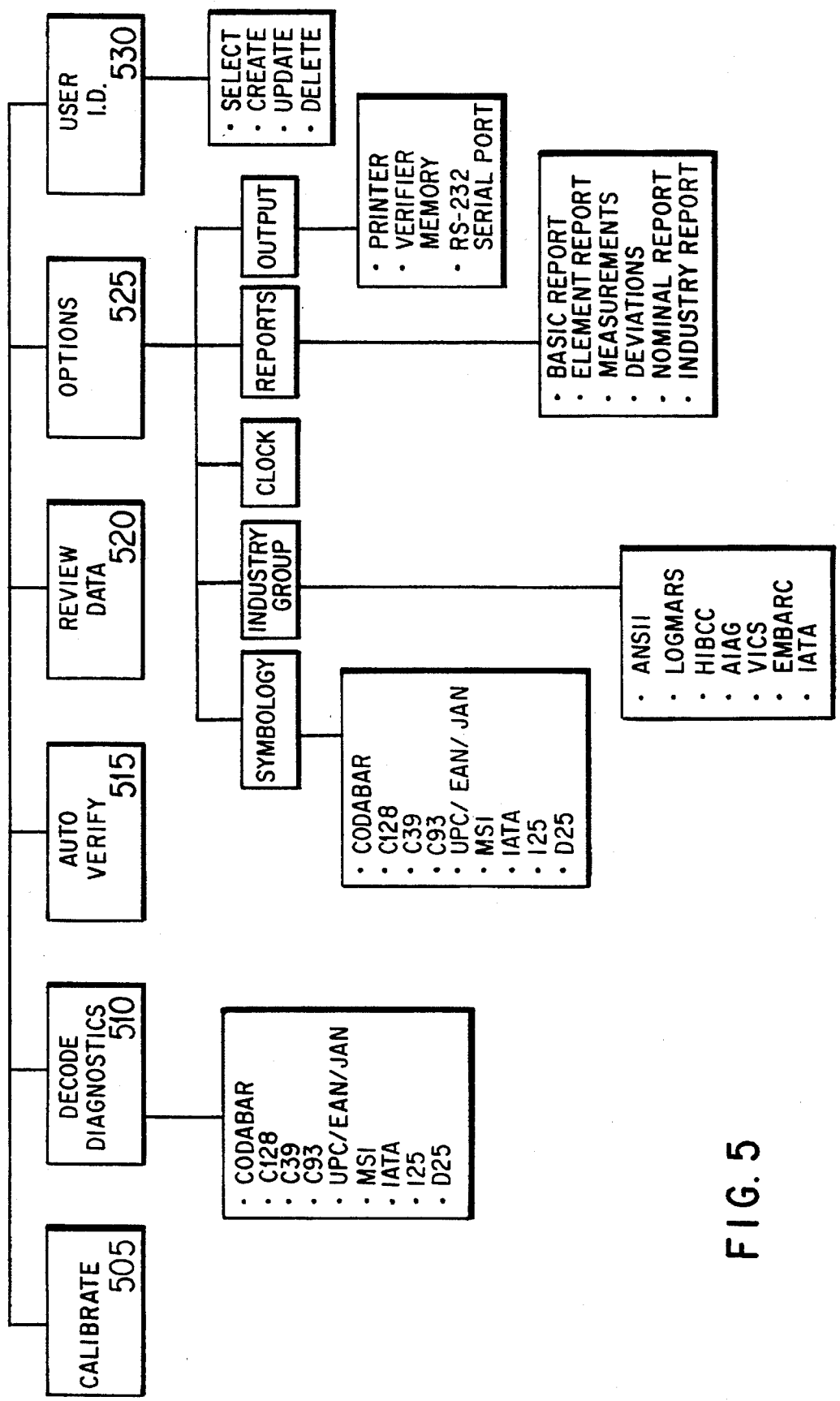
FIG. 5 shows an exemplary menu structure for the verifier of the present invention.

In operation, the verifier is menu driven. FIG. 5 shows the menu structure representing verifier function choices available to the user in one embodiment. In CALIBRATE mode 505, the verifier functions to set the maximum/minimum contrast limits and adjust the verifier measuring parameters for a given scanning module 105 orientation (distance and angle) relative to the bar code label 200 of interest. AUTO VERIFY mode 515 and DECODE DIAGNOSTICS mode 510 are used to scan bar code labels of interest and, subsequently generate information characterizing them. In AUTO VERIFY mode 515, the verifier automatically discriminates between symbologies currently enabled for searching and issues a diagnostic report on the type, content, readability and print quality of the scanned bar code label DECODE DIAGNOSTICS mode 510 is used to derive similar information when the user already knows the symbology of the bar code label of interest. In REVIEW DATA mode 520, the verifier is functional to review saved analysis sessions performed under AUTO VERIFY mode 515. OPTIONS mode 525 functions to allow the verifier user to select certain verifier features of diagnostic considerations and actual contents of the diagnostic reports. USER ID mode 530 allows the user to select, create, or delete specific user identification codes.

4.2.1 CALIBRATE

According to the non-contact feature of the present invention, bar code label 200 may be scanned by the scanning module 105 removed some arbitrary, but constant distance and oriented at some unknown, but constant, angle relative to the label 200. Calibration of the verifier for the arbitrary conditions is accomplished by means of a calibration routine in which one or more calibration standard bar code labels of known element (bar and space) dimensions and spacing and print contrast is scanned.

Figure 6B:
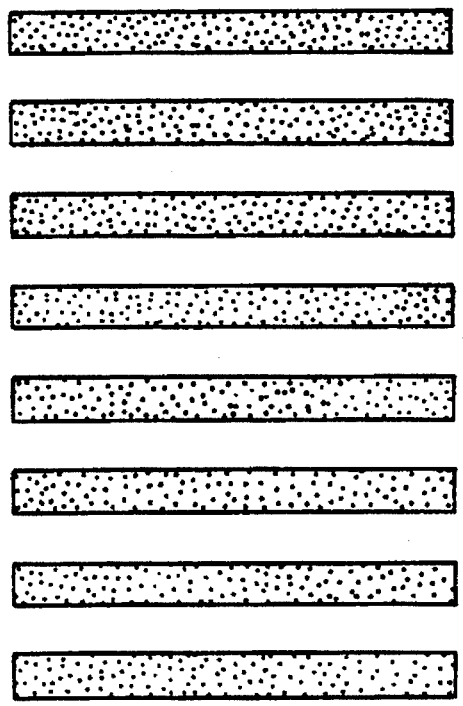
FIGS. 6A & 6B illustrate generally the appearance of black and gray calibration standards.
Figure 6A:

In order to ensure the accuracy of bar code diagnostics reporting, the user calibrates the verifier before its first use, and subsequently re-calibrates whenever the verifier orientation (distance and angle) relative to bar code labels of interest is changed. In one embodiment, when CALIBRATE mode 515 is selected, the verifier prompts the user to scan first the black calibration standard 600 shown in FIG. 6A followed by the gray calibration standard 605 shown in FIG. 6B. Alternatively, the verifier control software may be designed so that only a single label is scanned. Once this is done, the verifier calibration for that scanning orientation is complete. Scan distance and angle must remain relatively constant in subsequent scans performed in AUTO VERIFY mode 515 or DECODE DIAGNOSTICS mode 510. Scanner module trainer 400 may be employed as one way of ensuring this. Upon repositioning, the scanner must be re-calibrated for the new scan distance and angle.

Software components of the calibration system will become apparent hereinafter.

4.2.2 AUTO VERIFY

A verifier according to the present invention operating in AUTO VERIFY mode 515 performs diagnostics tests based on reflectivity information derived from the scan of a particular bar code label of interest. If calibration has not occurred, choosing AUTO VERIFY 505 from the menu leads directly to the unit monitor 410 displaying a prompt message requesting that the user calibrate before diagnostic scanning can occur.

After calibration has occurred, the verifier operating in AUTO VERIFY mode 505 prompts the user to scan the bar code label of interest and subsequently presents a diagnostic report based on (a) data derived from that scanning attempt, compared with (b) standard profile data, e.g., data concerning element widths, margins, tolerances, number of transitions, etc., for various bar code label classes (e.g., Code 39, etc.) stored in the memory unit 407. FIGS. 7A–E show the series of screens that would be used to report diagnostic information derived from a bar code label scan. The user may use the OPTIONS mode 525 choice to customize the information reported as well as the form in which it is reported. It will be apparent from the discussion in subsequent passages how the verifier processor derives the information reported in the diagnostics report from the digital and analog reflectivity signals.

FIG. 7A shows the processor unit monitor Analysis Screen 1 on which the verifier reports:

The date and time of the analysis;

The symbology (code type) of the scanned bar code label;

The encoded data content of the scanned bar code label;

The scannability trend index (STI), a weighted value of readability based on fat/thin element measurements, percent decode, and contrast; and, The American National Standards Institute (ANSI) specification grade assigned to the scanned bar code label.

FIG. 7B shows processor unit monitor Analysis Screen 2 on which the verifier reports:

Ratio of wide to narrow label elements (bars and spaces);

Element growth/loss (deviation from expected widths);

Left and right margin status;

Percent decode, the number of expected successful decodes of the label in 100 attempts; and, Minimum reflectance difference (contrast).

FIG. 7C shows two possible processor unit monitor Analysis Screens 3—labeled 3A and B—on which the verifier reports wide/narrow element attributes. The contents of this report might vary according to the symbology of the bar code label of interest as can be seen on the two different example screens.

FIG. 7D shows processor unit monitor Analysis Screen 4 on which the verifier reports absolute bar/space measurements for each character.

FIG. 7E shows processor unit monitor Analysis Screen 5 on which the verifier reports deviations from average for the element widths each character.

In the event of an unsuccessful decode attempt in AUTO VERIFY mode 515, the verifier issues diagnostic reports like those in FIGS. 7A–E that indicate failure of the verifier to read the label and, as much other information as is possible.

4.2.3 DECODE DIAGNOSTICS

In DECODE DIAGNOSTICS mode 510 a verifier according to the present invention analyzes reflectivity data gathered during a scan of a bar code label of known symbology and issues the user a general diagnostics report. After selecting DECODE DIAGNOSTICS mode 510 from the verifier main menu, the user is prompted to select the symbology of the bar code label of interest and, subsequently, to scan the bar code label. As before, the verifier compares scanned data from the bar code label with standard profile data for various bar code label classes stored in the memory unit 407.

Figure 8A:
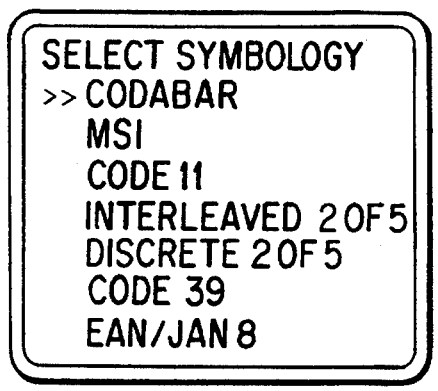
Figure 8B:
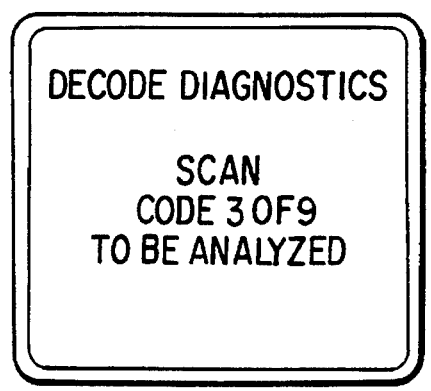
Figure 8C:
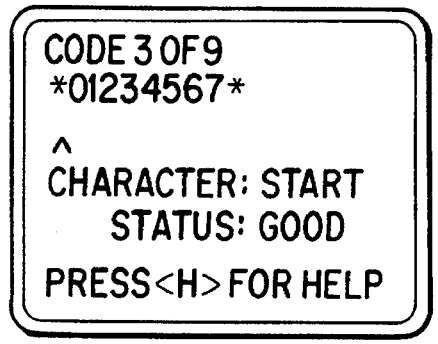

FIG. 8A shows the screen that so prompts the user. FIG. 8B prompts a scan operation which may be initiated by the user. If the bar code label scan is successful, the verifier will issue a diagnostics report as shown in FIG. 8C. That report indicates the code type of the bar code label, the encoded data content, and a general readability index of the label.

Figure 8D:
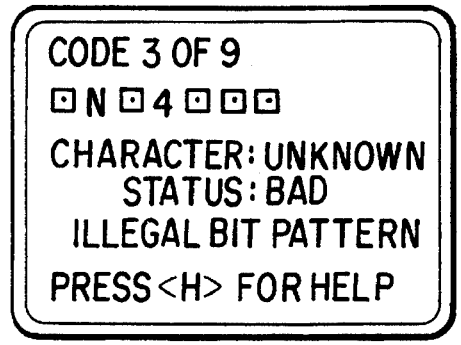

In the event of an unsuccessful decode attempt, the verifier may issue a partial diagnostics report as shown in FIG. 8D which delineates as much of the diagnostics data as possible and, indicates why the decode attempt failed.

Possible reasons for a DECODE DIAGNOSTICS decode failure include:

No start/stop character;

Bad check digit;

Margin out of specification;

Bad character placement;

Minimum Reflective Difference (contrast) below readability;

Incorrect number of data characters.

4.2.4 REVIEW DATA

A REVIEW DATA mode 520, selected from the verifier main menu allows the user to review diagnostic reports from previous AUTO VERIFY scans. To make the diagnostic reports available for review by REVIEW DATA mode 520, the verifier internal memory must be enabled through the OPTIONS 525 main menu choice as can be seen from FIG. 5. Selecting REVIEW DATA mode 520 from the main menu immediately calls up to the processor unit monitor 410 the first screen of the diagnostic report for the last label scan performed under AUTO VERIFY mode 515. Other diagnostic report screens may be retrieved by the user by appropriate input commands issued through the processor unit keyboard.

4.2.5 OPTIONS

An OPTIONS mode 525, selected from the verifier main menu, allows the user to customize the operation of the verifier in regard to the symbologies recognized; the industry group standards to be applied to the diagnostic analyses; clock operation; form of diagnostics reports; and, selection of diagnostic report output.

Symbology: Through this choice, the user may define which symbology types and variants will be diagnosed by the verifier operating in AUTO VERIFY or DECODE DIAGNOSTICS mode. If the symbology is a variable length code, the user may specify the lengths to be diagnosed. Legal symbologies might include, but not be limited to, UPC/EAN/JAN, CODABAR, IATA, I25, D25, C39, C93, C128. For UPC code types, for example, after choosing the symbologies, the user is prompted to choose among the following UPC variants: UPC A, UPC E, EAN 8, EAN 13, SUPP 2, or SUPP 5. Similarly, having selected a multi-length symbology, the user is prompted to selectively enable or disable the various code lengths available.

Industry Group: Through this choice, the user may specify a particular industry group standard which will be applied to the bar code diagnostics analyses performed in AUTO VERIFY or DECODE DIAGNOSTICS mode.

Clock: Through this choice, the user may initialize the time and date so that diagnostic reports can include time and date of testing.

Reports: Through this choice, the user can customize the form of the diagnostic reports issued by the verifier operating in AUTO VERIFY mode 515. Any of the Analysis Screens shown in FIGS. 7A–7E can be selectively enabled/ disabled by the user.

Output: Through this choice, the user is allowed to select the destination of the diagnostic report output. Available choices include: output port 415, printer port 420, and internal memory.

4.2.6 USER ID

In USER ID mode 530, a verifier operating according to the present invention allows the user to select, create, or delete user identification passwords for storing and retrieving individual customized verifier options selected in a session.

4.3 Hardware Setup

In one embodiment of the present invention, a bar code label verifier 100 comprises a scanning module 105 for directing a beam of radiation at a subject bar code 200, and for receiving reflected radiation representative of the constituency of the bar code label 200. Verifier 100 further comprises a processor unit 100, operatively connected to scanning module 105 by means of an electrical interface cable 115. The processor unit 110 may be a solid state, hand-held, electronic portable terminal for recording, storing and transmitting field data entered either through the scanning module 105 via the interface cable 115, or from the user directly via the keyboard 405. Alternatively, the processor unit 110 and scanning module 105 may be constructed as an integral unit.

4.3.1 Scanning Module

The scanning module 105 is preferably a derivative of the publicly available LS-2000 scanner gun manufactured and distributed by Symbol Technologies, Inc., the assignee of this invention; aspects of this scanner gun are described in the aforementioned U.S. Pat. No. 4,897,532, "Portable Laser Diode Scanning Head," by Swartz et al. A modified scanner board allows scanning module 105 to acquire analog reflectivity data and transfer it to the processor unit 110 via interface cable 115. So, the scanning module 105, although it has extra hardware, operates as a regular scanner as well.

4.3.2 Electrical Interface Cable

Interface cable 115 is a standard 10-pin cable assembly used to conduct signals from the scanner module 105 to the processor unit 110 and visa versa. In one embodiment, the cable transmits the following signals:

digital bar pattern;

analog VIDEO;

"start of scan edge";

trigger;

decode LED;

laser beam enable;

power supply; and ground.

The 'digital bar pattern' signal constitutes the digital reflectivity data derived from the scan means. The signal characterizes the relative spatial relationships between bars and spaces comprising the bar code label of interest 200. As explained previously, this signal is timed in the terminal to determine relative temporal relationships between bars and spaces, which relationships can later be converted to absolute spatial relationships using data acquired during calibration.

The 'analog VIDEO' signal is the analog reflectivity signal exactly as it comes from the scan means. Terminal processing of the 'analog VIDEO' signal is described below under "Analog Circuitry".

The 'start of scan edge' signal originates in the scanning module 105 and is used to mark the start of a left-to-right or right-to-left laser beam sweep. This signal is vital to proper terminal interpretation of the digital and analog reflectivity data coming from the scanning module 105.

The 'trigger' signal is used by the scanning module 105 to signal the processor unit to turn 'ON' the laser beam in response to depression of the trigger 120 by the user.

The 'laser beam enable' signal originates in the processor unit 110 in response to the receipt of the 'trigger' signal from the scanning module 105. This signal enables the laser beam for a bar code label scan in response to depression of the trigger 120 by the user.

The 'decode LED' signal originates in the processor unit 110 and is used to control a light emitting diode (LED) on the scanning module 105 for the purpose of alerting the user to the completion of a successful decode attempt.

4.3.3 Processor unit

Processor unit 110 is preferably a solid state, hand-held, electronic portable terminal for recording, storing and transmitting field data entered either through the scanning module 105 via the interface cable 115, or from the user directly via the a keyboard 405. Processor unit 110 is provided with a microprocessor, random access memory, a gate array for implementation of all terminal logic, a power management (voltage regulation) system of integrated chips, and some analog circuitry for treatment of analog reflectivity data received from the scanning module 110. A customer replaceable 32KB or 64KB EPROM (custom application module) is provided as an additional feature for changing the application program.

4.3.3(a) Microprocessor

Microprocessor is preferably of a type like the Hitachi 64180. This device is a Z-80 code compatible eight bit microprocessor with an on-board memory management unit, two UART's, two sixteen bit timers, an interrupt controller, direct memory access circuitry, and other features as disclosed in the Hitachi HD64180 Data Book (January 1988).

4.3.3(b) Memory

In one embodiment, memory of three sorts is employed by the verifier of the present invention. See Appendix C, included in the parent application, which issued as U.S. Pat. No. 5,218,190 (hereby incorporated by reference), for an address map.

Read only memory (ROM), in the form of a 64KB run time system (RTS) erasable programmable read only memory (EPROM), is used to store the run time terminal operation program.

A 32KB or 64KB customer replaceable EPROM, also known as a custom application module (CAM), is provided for application programs. The verifier application resides in the CAM. The run time system EPROM will determine which size CAM is inserted and make appropriate arrangements.

The CAM is preferably accessible to the user, for example, under a battery compartment cover. Notably, by replacing the CAM with a suitably programmed CAM in the conventional manner, the user may operate the verifier as a bar code reader, thus getting "double duty" out of the verifier apparatus.

The verifier of the present invention uses CMOS static random access memory (RAM) chips. A verifier might be equipped with, for example, 128KB or 256KB RAM depending on the number of populated RAM chip sites.

4.3.3(c) Gate Array.

According to one stated advantage of the present invention over the prior art, a bar code label verifier according to the present invention is more conveniently portable, and less expensive than prior art verifiers. In large part, these advantages are related to the use of a custom gate array to handle most of the terminal control functions. That custom gate array handles osm of the I/O functions including LCD select, real time clock, keyscan, write protection, interrupts, laser DMA and output latches for some communications and RS-232 signals. The gate array also generates the I/O select signals for controlling latches and tri-state buffers located external to the device.

In addition, the gate array generates the run time system (RTS) and Custom Application Module (CAM) EPROM enable signals, as well as RAM select signals for the various RAM memory devices.

4.3.3(d) Communications

An RS-232 board is provided for communication between the processor unit 110 and a host computer. The RS-232 board contains the necessary voltage convertors and drivers for true RS-232 level signals.

An external serial interface device (ESID) connector is provided to accommodate use of any one of a plurality of existing contact or non-contact scanners, including the LS-2000 laser scanner that is part of the LaserChek II (Symbol Technologies, Inc.) bar code verifier designed according to this invention. Data output to this interface is output through a UART located in the 64180 microprocessor. Signals are provided which allow the terminal software to determine which peripheral device is attached to the prot and so adjust its response accordingly. Data input from the peripheral to the interface is directed to an I/O controller, and to the UART in the microprocessor. Data input from a wand or scanner will be input through the I/O controller; ASCII data from any other peripheral device may be input into the built-in UART in the microprocessor.

The analog reflectivity signal derived in the scanner module 105 is not handled by the ESID interface. It is handled instead by analog circuitry in the terminal as described below.

4.3.3(e) Analog Circuitry

According to one feature of the present invention, means are provided for measuring reflectivity contrast characteristics of bar code label 200. As previously described, an analog signal which represents the non-discrete reflectivity levels perceived by scan means is derived by the scanner module 105. That signal appears at one of the contacts coming down interface cable 115 and varies between zero and three volts peak according to the character and composition of the bar code label of interest 200. In the processor unit 110, this signal is called VIDEO.

The VIDEO signal goes from the interface cable 115 to a differential amplifier. The differential amplifier configuration effectively nulls out any common mode noise that comes into the processor unit 110 with the desired signal. The amplifier multiplier function increases the amplitude of the signal by a factor of 1.5, so that an analog signal varying between zero and four-and-one-half volts is directed into a digitizer chip.

A state machine drives the digitizer with the proper timing for sampling the analog input at the highest possible rate consistent with the microprocessor speed. Data from the digitizer are stored directly into RAM using the direct memory access (DMA) port on the microprocessor. The state machine coordinates data transfer to RAM.

4.3.3(f) Other

To accommodate the lower output voltage of NICAD batteries, where used, a low resistance HEXFET transistor is used in a voltage regulator circuit. The gate voltage of the HEXFET is controlled by a CMOS op-amp which compares the regulated voltage to a reference voltage. When the power is on, the op-amp's negative supply becomes a diode drop above −10V. When the battery voltage drops below that needed to maintain the desired regulated voltage, the output of the op-amp will go to its negative rail. This will result in the largest $|V_{gs}|$ and, therefore, the smallest possible voltage drop across the HEXFET.

The processor unit 110 uses all CMOS technology. An eight line by twenty character (64×120) dots graphics Supertwist display is used to provide low power consumption.

Printer port 420 consists of a six pin connector and is compatible with, for example, the PDT III printer port.

4.4 Software Setup

A verifier according to the present invention includes software means for the implementation of a plurality of functions related to calibration, to label identification or to analysis of readability and print quality.

4.4.1 Calibration.

In accordance with the non-contact feature of the present invention, the orientation of the verifier scanning module 105 relative to the bar code label 200 of interest is assumed to be unknown. Part of the software function of the processor is to calibrate the measurement scheme of the verifier for a particular scan distance and angle.

Two challenges are introduced by the non-contact feature of the verifier: (1) "teaching" the verifier to measure distances (widths of bar code elements, etc.) at an arbitrary, but constant scanning distance and angle and, (2) "teaching" the verifier how to measure contrast at an arbitrary, but constant scanning distance and angle.

The former problem—how to measure distances—relates to the fact that the verifier sensor measures reflectivity versus time as opposed to reflectivity versus distance. The emitter means produces a scan beam across the bar code label. This scan beam 900 is illustrated in FIG. 9 in relation to a bar code label 200 being scanned. Of course, the image of the laser light emitted by the emitter means actually looks like a small dot; the continuous beam image 900 is due to the fact that the dot is sweeping side-to-side at a rapid pace. FIG. 10 illustrates how placement of a bar code label 200 at an unknown distance from the emitter means of the scanning module 105 will render the verifier unable to discern absolute widths of bar code elements. It will be apparent in view of this disclosure that a certain time, $t_{sweep}$, is required for a right-to-left or a left-to-right beam sweep along the laser path 1000 regardless of where in the beam path the bar code label 200 is placed. Therefore, without calibration, the verifier has no way of distinguishing between a bar 20 mils wide placed six inches from the scan window 125 and a bar 40 mils wide placed twice as far away.

In addition, as the dot sweeps back and forth, the motor that drives the emitter varies in speed. At either the left or the right end of the projected laser path 1000, the motor has zero velocity because it is turning around. As it starts back toward the center of the laser path 1000, it accelerates to its maximum velocity before it reaches the middle of the scan beam 900. It begins to decelerate again before it eventually reaches a stop at the other end of the laser path 1000. This varying velocity further complicates the matter of absolute distance measurement without a calibration method.

The latter problem with non-contact verification—"teaching" the verifier to properly measure contrast at a distance—relates to the fact that incidental ambient lighting effects the way the verifier sensing means perceives light reflected from the bar code label. Part of the rating of the readability of bar code labels depends on the contrast level—the difference between the reflectivity level of the bars 205 and that of the spaces 210 that comprise the label 200. Contrast differences are frequently taken into account in the design of the optical system in a verifier, but the contrast problem can usefully be addressed in the calibration process as well.

In order to avoid inconsistencies in measurement of distances and contrast, the present invention provides a software calibration method by which these two non-contact problems are corrected. At the user level, calibration consists of selecting CALIBRATE MODE 505, and then scanning a black calibration standard 600 and a gray calibration standard 605 in response to prompts from the verifier.

Then, internally to the verifier, the distance by which the scanning module is removed from the bar code label is determined by observing differences in the perceived widths and spacing of bar code elements on the black and gray calibration standards 600, 605—all of which elements are or known equal size and placed at equal distances from one another. The data points acquired by the calibration scan operations are divided into zones, called bins—256 bytes comprising each bin which represent reflectivity data acquired in equi-time sweep segments. The true absolute widths or the calibration standard elements are stored in memory accessible to the processor. In one embodiment, each pair of adjacent transitions, and, therefore, each bar or space, is 30 mils wide. Bins usually hold two or three transitions. The conversion of bar code element data from time to distance units can thus be readily accomplished by the processor. As an example, a particular bin might contain two adjacent transitions which are 150 data points (data points being acquired at equi-time intervals) apart. Since it is known that the transition-to-transition width should be 30 mils, a conversion factor of 150-to-30 or 5-to-1 data points-to-mils is calculated for that bin. The conversion factors, different for each bin, are stored for use in normal operation (AUTO VERIFY or DECODE DIAGNOSTICS modes). Once the verifier has been calibrated for a particular scan distance, it converts data characterizing temporal relationships it acquires through the sensor into data reflecting spatial relationships and, further, into absolute distance data by use of this conversion scheme.

In addition, contrast levels perceived by the scan means during the calibration scan operations can be compared to expected contrast levels for the known black and gray calibration standards 600, 605 and, subsequently, measurement sensitivity can be adjusted for the ambient lighting conditions affecting the verifier scan means. Contrast levels are measured for the calibration standards 600, 605 by again dividing the scan sweep into zones—or bins—each comprising 256 bytes, and finding the difference between the darkest (least reflective) and the lightest (most reflective) points in each of the bins. The black bars on the black calibration standard 600 represent absolute black—or as close to it as is possible with printed labels. The gray bars on the Fay calibration standard 605 represents the lightest bar coloring reliably readable by the verifier sensor.

Specifically, contrast is read from the analog reflectivity data as the difference between the intensity of light reflected by spaces and that of the light reflected by bars. So, on a contrast scale with levels 1–10, an eight is a high contrast level and a two is a low contrast level. Now, black and gray calibration standards 600, 605 are printed at known contrast levels, one with high contrast and one with low contrast as previously shown. During calibration, a contrast level for each bin on each label is derived. Now, for each bin there exists a high contrast level index, derived from the black calibration standard 600, and a low contrast level index, derived from the gray calibration standard 605. Thus, a calibration scale relating perceived contrast levels to actual contrast levels is derived for each bin in the measuring sweep. The scale can be illustrated graphically by imagining a graph on which the x-axis represents perceived reflectivity levels and the y-axis represents actual reflectivity levels. A line is defined between the two points derived in calibration—a dark and a light standard. Linear, interpolation can be used to derive an actual contrast level (relative to the known standards) for any label for which a perceived contrast level has been found.

4.4.2 Software Generated Indices and Information

Once the verifier software has been "taught", via calibration, how to measure distances and contrast levels against known standards, a number of indices that characterize quality and readability of bar code labels can be calculated for scanned bar code labels of interest. In AUTO VERIFY or DECODE DIAGNOSTICS mode, the verifier acquires twenty-nine series of data—twenty-eight digital and one analog—which represent the reflectivity levels perceived by the sensing element in the verifier scanning module. Ideally, the twenty-eight digital sweeps should contain identical measurements. In reality, chances are that they will vary slightly from one to another. The first twenty-six data series are used strictly to derive percent decode as shown hereinafter. The next data series (the twenty-seventh and twenty-eighth) are used for all other digital calculations. The final data series (the twenty-ninth) is the analog series and is used for contrast analysis as disclosed hereinafter.

Software routines derive a plurality of indices from the digital data, analog data, and a combination of analog and digital data.

Digital Processing: Binary digital reflectivity data yield the following indices and information about the bar code label of interest:

Absolute widths of elements (bars and spaces);

Average absolute widths of wide and narrow elements (bars or spaces) and wide-to-narrow ratio;

Average width of bars and spaces;

Number of transitions;

Size of bar code margins;

Percent decode

Absolute widths of bars and spaces are determined by the application of the calibration conversion factors derived for each bin during the calibration step. Transition widths are measured in time, not distance as disclosed in "Overview of Verifier Operation". The temporal relationship between transitions is converted to a spatial relationship using the conversion scale calculated during calibration.

Average widths of wide and narrow elements—whether bars or spaces—are calculated from binary digital reflectivity data by averaging the absolute widths of transition (high-to-low-to-high or low-to-high-to-low). The ratio of the average width of wide elements to that of the narrow elements is calculated.

The average absolute width of bars and the average absolute width of spaces are calculated from binary digital data. A bar is identified as a bar by virtue of its lower reflectivity level. Indices corresponding to the average width of bars and the average width of spaces are calculated by applying the calibration-generated scale for temporal-to-spatial conversions.

The number of transitions—high-to-low or low-to-high—is calculated by counting the number of changes in digital level in the series of data characterizing the digitized reflectivity levels.

Bar code margins 215, the regions to either side of the bar and space sequence in a bar code label, are shown in FIG. 2. According to the various symbology specifications, they are set at certain absolute or relative widths but are always wider than any other bar code elements by some set multiple. Margins are identified by the software of the present invention as positions where there is a wide-to-narrow ratio of adjacent elements that exceeds 6-to-1.

Percent decode is a standard, index reflective of the probability that a single scan of a bar code would result in a successful decode. In a well designed bar code scanning system, that number will approach 100%. Percent decode is determined by attempting to decode each of the first twenty-six digital data series, and then determining the percent of those attempts ending with a successful decode.

Analog Processing: Analog processing consists of contrast analysis. Analog reflectivity, data are analyzed binwise—as in the calibration operations—for the highest and lowest reflectivity level in each bin. The contrast is the difference between the highest and lowest reflectivity value. The perceived contrast in each bin is converted to actual contrast using the scale and method outlined above. The average of the bin-wise contrast is the contrast for the entire bar code label.

In order to avoid inaccurate contrast ratings due to peripheral label print, the verifier analyzes only analog data that actually correspond to the bar code label area. The bar code area is determined by the digital measurements and decode routine. Bin-wise contrast analysis is performed only on the analog data corresponding to the label itself. Thus, non-bar code printing near the bar code label does not distort contrast ratings.

In general, higher contrast levels correspond to better readability. The high-end of the contrast scale is represented by the contrast level derived by the scan of the black calibration standard. There is low-end contrast level below which the sensing means in the verifier scanning module is unable to reliably discern the difference in bars and spaces. That level is represented by the contrast level recorded from the scan of the gray calibration standard.

Digital and Analog Processing: An important aspect of verification is the ability of the verifier to accurately predict the readability of the bar code labels being tested. Along these lines, another feature of the present invention is a weighted index of five digital and analog factors that influence general readability of a bar code label. Those five factors are:

Bar Width Ratio;

Percent Decode;

Margins; and,

Digital Measurements;

Label Contrast.

The bar code label of interest is assigned a score from 0 to 100 for each of the factors. In the index, each of the five scores is weighted, according to its absolute level. Lower scores are more heavily weighted. Table I (Appendix A), included in the parent application, which issued as U.S. Pat. No. 5,218,190 (hereby incorporated by reference), shows the scheme for varied weighting of the factors. Pseudo code (Appendix B), included in the parent application, which issued as U.S. Pat. No. 5,218,190 (hereby incorporated by reference), reflects the weighting scheme.

4.4.3 AUTO VERIFY Method

As disclosed, a verifier according to the present invention comprises a feature by which a bar code label is identified as belonging to a particular symbology and is decoded without a priori knowledge of the symbology type. In the specific embodiment described heretofore, this feature is called AUTO VERIFY mode 515.

In AUTO VERIFY mode 515, the verifier automatically identifies a scanned bar code label as belonging to one of the known symbologies enabled for identification by the user. The method used to identify the symbology of and decode a bar code characterized by binary digital data derived from a scan operation is implemented as a software function performed in the processor unit.

The method for AUTO VERIFY is:

(1) Locate bar code label data among scan data by identifying bar code margins;

(2) Count number of binary digital transistors between bar code margins and eliminate symbologies requiring different numbers of transitions; and, (3) Attempt to decode bar code character-by-character for symbologies not eliminated in step #2.

In the first step, bar code margins are identified. According to symbologies specifications there is to be a large amount of white space off either side of a bar code label. In order to identify these margins, and thereby locate the bar code data among the scan data, the verifier software looks at transition widths of the binary digitized scan data acquired by the scan operation. A margin is identified by the software as a wide element adjacent to a narrow element with wide-to-narrow ratio between them of at least 6-to-1. Having identified both margins, the verifier software "knows" which of the scan data characterize the bar code itself—those data between the margins.

Having properly discerned the bar code margins and, thereby, the bar code region, the software proceeds to eliminate certain possible symbologies by counting the number of binary transitions (high-to-low and low-to-high) in the bar code region. Only certain numbers of transitions are allowed for certain symbologies. For instance, for Code 39, each data character must have ten transitions, except for the last one which must have nine. Accordingly, a bar code label with a number of transitions other than 19, 29, 39, etc. cannot possibly be a Code 39 label. Similar restrictions apply to other symbologies.

Finally, a character-by-character decode attempt is made for each remaining possible symbology in order from high to low security—or confidence—level. As known in the art, security levels reflect the confidence a decoder can have in the accuracy of a particular decode attempt. With higher security level codes, the decoder has a greater level of confidence that, if the bar code is decoded to yield particular data contents, those contents are correct. Therefore, the user can have a greater degree of confidence in the final answer. If a character cannot be decoded using the conventions of a particular symbology, that symbology is abandoned and the verifier software moves on to check the next symbology in the security level table.

In the event of a decode attempt still unsuccessful after all possible symbologies have been exhausted, the verifier reports an unsuccessful decode attempt and lists as much information about the label as is possible.

It will be recognized that at the completion of this three step AUTO VERIFY routine, the software will have not only identified the symbology of the scanned bar code label, but also decoded its data contents.

4.4.4 Reflectance Compensation for High-Density Labels

The accuracy of scan data can be reduced if the width of an element (bar or space) of a bar code label is less than the spot size of the laser beam, because the radiation reflected from such an element is less than from, e.g., an element that is wider than the spot size. In an embodiment of the present invention, this factor is taken into account by increasing the computed reflectance of spaces, and decreasing the computed reflectance of bars. The following table shows a convenient set of adjustment values as explained below:

| Narrowest element size | Percentage increase/decrease |
| --- | --- |
| ≦7 mils | 36 |
| 8 mils | 34 |
| 9 mils | 32 |
| 10 mils | 26 |
| 11 mils | 22 |
| 12 mils | 19 |
| 13 | 6 |

The reflectances of the elements read in a bar code label are adjusted in accordance with the width of the narrowest element read. For example, if the narrowest element scanned is 9 mils, the reflectance of the spaces is increased by 32%, while the reflectance of the bars is decreased by 32%. This compensates for lower amplitude of the analog signal for high density labels due to a larger spot size. Above 14 mils in width, such a correction may be omitted.

5. CONCLUSION

The present invention provides means and method for non-contact bar code label verification. Features new to the art may be combined to produce a verifier able to measure absolute label dimensions at an arbitrary distance, and, additionally, provide instructive new indices about the readability and print quality of the label, as well as discern print contrast Bar code verification information may be stored and/or used for a variety of control and analytical functions as recognized in the art.

The foregoing description of the present invention is illustrative, and is not intended to limit the invention to the precise form disclosed.

What is claimed is:

1. A method of verifying a reflectivity characteristic of a target symbol when the target symbol is positioned at a substantial distance from the verifier apparatus, the target symbol being of the type including a pattern of elements having less-reflective areas and more-reflective areas, said method comprising the steps of:

providing calibration information to a verifier apparatus;

positioning the verifier apparatus, including a radiation emitter and a radiation detector, at a predetermined substantial distance from the location of said target symbol;

directing radiation from said emitter to a plurality of points on said target symbol comprising scanning a beam of radiation across said target symbol at a variable scan rate;

receiving radiation reflected from said target symbol;

processing the received radiation to generate reflectivity data representing reflectivity conditions at a plurality of points on said target symbol;

using the calibration information to compensate the reflectivity data to provide compensated reflectivity data, said calibration information including information for compensating for said variable scan speed; and processing the compensated reflectivity data to provide a measurement of said reflectivity characteristic.

2. The method of claim 1 wherein the calibration information comprises information for compensating for the predetermined substantial distance at which the target symbol is positioned.

3. The method of claim 1 wherein said steps of providing calibration information and using the calibration information comprise the steps of:

placing at least one calibration standard at the location of said target symbol, said calibration standard including a pattern of elements having less-reflective areas and more-reflective areas;

directing radiation from said emitter to a plurality of points on said calibration standard;

receiving radiation reflected from said calibration standard;

processing said received radiation to produce measured characteristics of said calibration standard;

comparing said measured characteristics of said calibration standard to known characteristics of said calibration standard;

generating correction factors based on said comparison;

using the correction factors to compensate the reflectivity data.

4. The method of claim 3 wherein one said measured characteristic of said calibration standard is the distance between two elements.

5. The method of claim 3 wherein said measured characteristics of said calibration standard are the same characteristic measured at different positions along said calibration standard, and said correction factors include correction factors for different positions along said target symbol.

6. A method of measuring a characteristic of a target symbol which is positioned at an arbitrary distance from a verifier apparatus, the target symbol being of the type including a pattern of elements having less-reflective areas and more-reflective areas, said method comprising the steps of:

manually positioning the verifier apparatus, including a manually actuatable radiation emitter, and a radiation detector, at a distance from the location of said target symbol;

manually directing a radiation beam from said emitter to points on said target symbol by scanning the beam across the target symbol at a variable scan speed;

receiving radiation reflected from said target symbol to said apparatus;

processing the received radiation to generate test data representing a parameter related to a measurement of a characteristic of said target symbol;

providing calibration information to compensate the test data, said calibration information including information for compensating for said variable scan speed; and processing the test data with said calibration information to provide a measurement of said reflectivity characteristic.

7. The method of claim 6 wherein the calibration information comprises information for compensating for the distance at which the target symbol is positioned.

8. The method of claim 6 wherein said step of providing calibration information comprises the steps of:

placing at least one calibration standard at the location of said target symbol, said calibration standard including a pattern of elements having less-reflective areas and more-reflective areas;

directing radiation from said emitter to a plurality of points on said calibration standard;

receiving radiation reflected from said calibration standard;

processing said received radiation to produce measured characteristics of said calibration standard;

comparing said measured characteristics of said calibration standard to known characteristics of said calibration standard;

generating correction factors based on said comparison;

using the correction factors to compensate the test data.

9. A method of measuring a characteristic of a target symbol which is positioned at a fixed distance from a verifier apparatus, the target symbol being of the type including a pattern of elements having less-reflective areas and more-reflective areas, said method comprising the steps of:

positioning the verifier apparatus, including a manually actuatable radiation emitter, and a radiation detector, at said fixed distance from the location of said target symbol;

scanning a radiation beam from said emitter across said target symbol, with the scanning speed varying along said symbol in the scan direction;

receiving radiation reflected from said target symbol to said apparatus;

processing the received radiation to generate test data representing a parameter related to a measurement of a characteristic of said target symbol;

providing calibration information to compensate the test data for said variable scanning speed; and processing the test data with said calibration information to provide a measurement of said reflectivity characteristic.

\* \* \* \* \*